United States Patent
Gong et al.

(10) Patent No.: US 8,231,373 B2
(45) Date of Patent: Jul. 31, 2012

(54) INSERT MOLDING APPARATUS

(75) Inventors: Wen-peng Gong, Tu Cheng (TW); Xiao-ping Wu, Tu Cheng (TW); Shih-hsiung Ho, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 46 days.

(21) Appl. No.: 12/906,897

(22) Filed: Oct. 18, 2010

(65) Prior Publication Data
US 2012/0093967 A1    Apr. 19, 2012

(51) Int. Cl.
*B29C 45/14*    (2006.01)
(52) U.S. Cl. ............... 425/112; 425/127; 425/129.1
(58) Field of Classification Search .......... 425/112, 425/127, 129.1
See application file for complete search history.

(56) References Cited

U.S. PATENT DOCUMENTS

| | | | | |
|---|---|---|---|---|
| 3,467,986 | A | * | 9/1969 | Canty et al. ............. 425/129.1 |
| 3,824,053 | A | * | 7/1974 | Styrkowicz ............. 425/123 |
| 7,871,552 | B2 | * | 1/2011 | Srostlik et al. ............. 425/112 |

\* cited by examiner

*Primary Examiner* — Tim Heitbrink
(74) *Attorney, Agent, or Firm* — Cheng-Ju Chiang

(57) ABSTRACT

Disclosed is an insert molding apparatus employed to form a plastic product with an insert. The insert has an inserting unit and an extending unit. The insert molding apparatus comprises a cope plate, a lower die and a holding mechanism. The cope plate is formed with a cavity. The extending unit dips into the cavity. The holding mechanism is installed on the lower die to hold the extending unit of the insert. When the insert molding apparatus of the present invention is opened, the holding mechanism can hold the extending unit of the insert to prevent the plastic product sticking to the cope plate. Accordingly, it is capable to prevent the plastic product crushed when the insert molding apparatus is closed again.

2 Claims, 3 Drawing Sheets

INSERT MOLDING APPARATUS

BACKGROUND OF THE INVENTION

The present invention generally relates to a molding, and more particularly to an insert molding apparatus to prevent a product sticking thereto.

Please refer to FIG. 1, which shows an insert molding apparatus 100' employed to form a plastic product having an insert 30'. The insert 30' comprises an inserting unit 31' and an extending unit 32'. The insert molding apparatus 100' comprises a cope plate 10' and a lower die 20'. The cope plate 10' is formed with a cavity 11'. The inserting unit 31' dips into the cavity. The extending unit 32' dips into the lower die 20'.

However, as the aforesaid insert molding apparatus 100' is opened, the plastic product frequently sticks to the cope plate 10'. Therefore, it is easy to result in that the plastic product crushed when the insert molding apparatus is closed last.

SUMMARY OF THE INVENTION

For solving the drawbacks of the aforementioned prior art, an objective of the present invention is to provide an insert molding apparatus to prevent a product sticking to the cope plate of the insert molding apparatus.

For realizing the aforesaid objective, the insert molding apparatus of the present invention is provided to form a plastic product with an insert. The insert has an inserting unit and an extending unit. The insert molding apparatus comprises a cope plate, a lower die and a holding mechanism. The cope plate is formed with a cavity. The extending unit dips into the cavity. The holding mechanism is installed on the lower die to hold the extending unit of the insert.

As aforementioned, as the insert molding apparatus of the present invention is opened, the holding mechanism can hold the extending unit of the insert to prevent the plastic product sticking to the cope plate. Accordingly, it is capable to prevent the plastic product crushed when the insert molding apparatus is closed again.

DETAILED DESCRIPTION OF THE INVENTION

Figure 1:
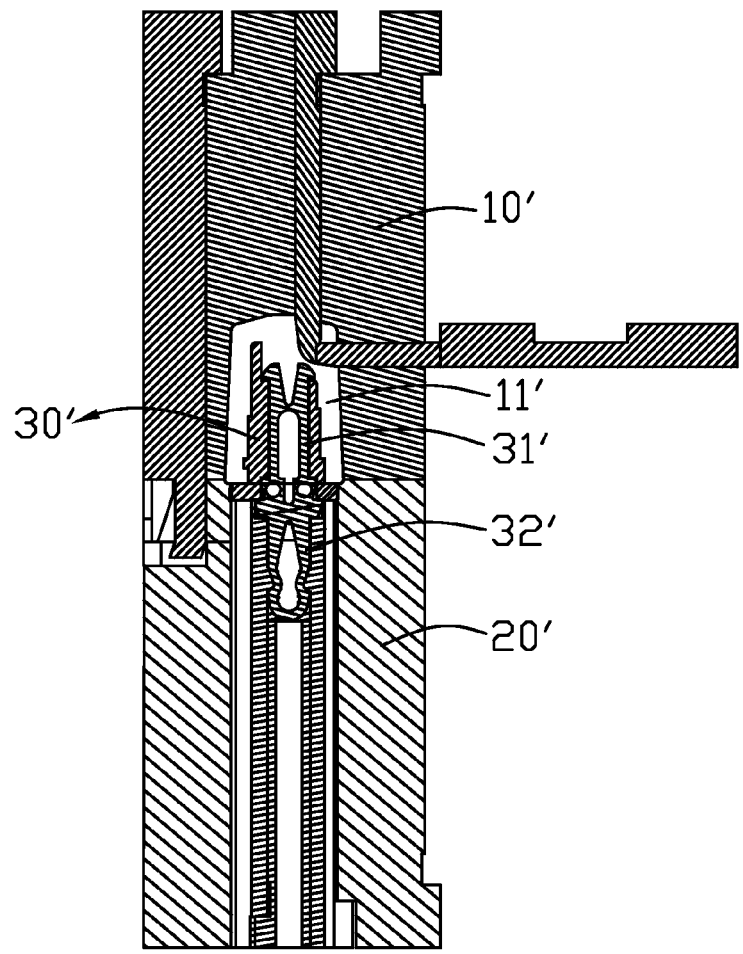
FIG. 1 shows a front sectional view diagram of an insert molding apparatus according to prior art.
Figure 2:
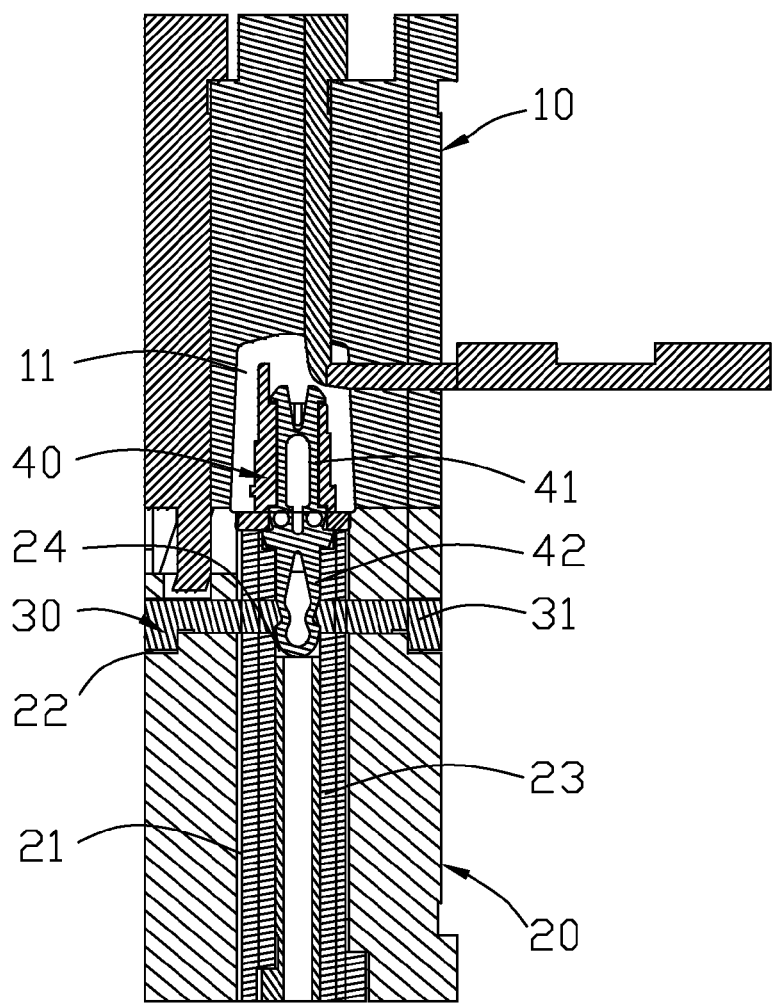
FIG. 2 shows a front sectional view diagram of an insert molding apparatus in a close status according to the present invention.
Figure 3:
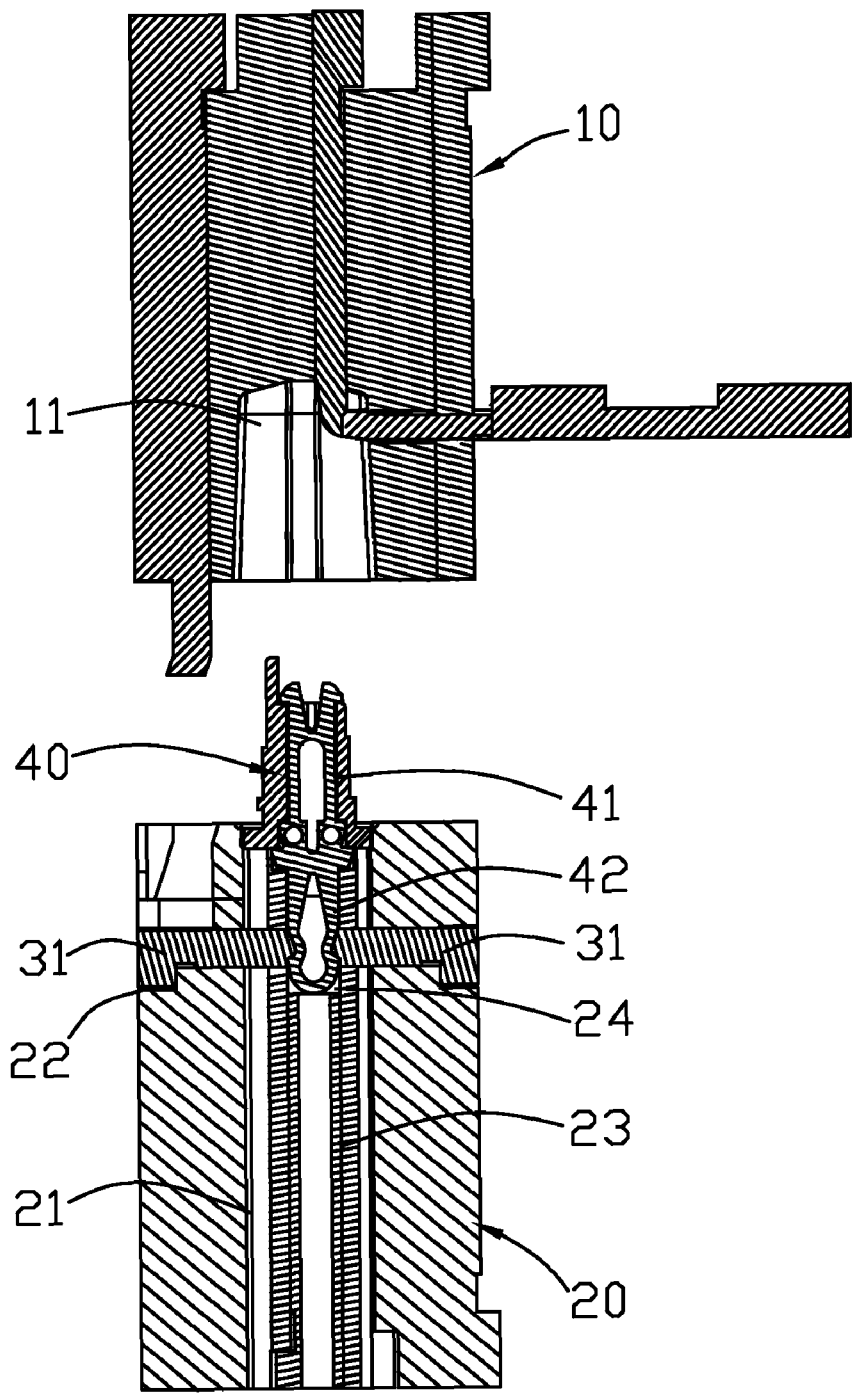
FIG. 3 shows a front sectional view diagram of the insert molding apparatus in an open status according to the present invention.

Please refer to FIG. 2 and FIG. 3. The insert molding apparatus 100 of the present invention is employed for forming a plastic product with an insert 40. The insert 40 has an inserting unit 41 and an extending unit 42. The insert molding apparatus 100 comprises a cope plate 10, a lower die 20 and a holding mechanism 30.

The cope plate 10 is formed with a cavity 11 therein. The lower die 20 comprises an open slot 21 formed therein. Two holding slots 22 are formed at two sides of the open slot 21. A plurality of die blocks 23 are plugged into the open slot 21. An accepting space 24 is opened downwards on the top of the die blocks 23.

The holding mechanism 30 is installed on the lower die 20 and comprises two holding blocks 31.

When the mold injection is in progress, the extending unit 42 of the insert 40 is plugged in the accepting space 24 of the lower die 20. The two holding blocks 31 are fixed in the holding slots 22 to hold the extending unit 42 for fixing the insert 40. The inserting unit 41 of the insert 40 is revealed out of the upper surface of the lower die 20. When the insert molding apparatus 100 is opened, the two holding blocks 31 hold the insert 40 to stay still for completely separating the plastic product from the cope plate 10. When the plastic product is checked out, the extending unit 42 can be off hooked from the two holding blocks 31 with the elastic deformation thereof.

As aforementioned, the holding mechanism 30 of the insert molding apparatus 100 of the present invention can hold the extending unit 42 of the insert 40 to prevent the plastic product sticking to the cope plate 10. Accordingly, it is capable to prevent the plastic product crushed when the insert molding apparatus 100 is closed again.

The insert molding apparatus 100 of the present invention is not limited by the foregoing illustrated embodiment. For example, the holding mechanism can comprise holding blocks slidably installed on the lower die and a spring positioned between the lower die and the holding blocks. The spring elastically presses against the holding blocks.

What is claimed is:

1. An insert molding apparatus, employed to form a plastic product with an insert, having an inserting unit and an extending unit, the insert molding apparatus comprising:
    a cope plate, formed with a cavity where the extending unit dips into;
    a lower die; and
    a holding mechanism, installed on the lower die to hold the extending unit of the insert.

2. The insert molding apparatus of claim 1, wherein the holding mechanism comprises two holding blocks, fixed in two holding slots and the two holding slots through the lower die are formed at two sides on the top of the lower die.

* * * * *